United States Patent
Groves et al.

(10) Patent No.: US 10,420,274 B2
(45) Date of Patent: Sep. 24, 2019

(54) ROTATIONAL FLUID JOINT FOR AGRICULTURAL MACHINE

(71) Applicant: Deere & Company, Moline, IL (US)

(72) Inventors: Tyler G. Groves, Bettendorf, IA (US); Juan Quintanilla, San Nicolás de los Garza (MX); Elia Mayela Nieblas, Monterrey (MX); Myrna Yadira Said, Guadalupe (MX)

(73) Assignee: DEERE & COMPANY, Moline, IL (US)

( * ) Notice: Subject to any disclaimer, the term of this patent is extended or adjusted under 35 U.S.C. 154(b) by 1031 days.

(21) Appl. No.: 14/868,069

(22) Filed: Sep. 28, 2015

(65) Prior Publication Data
US 2017/0086354 A1     Mar. 30, 2017

(51) Int. Cl.
| | |
|---|---|
| *A01C 7/08* | (2006.01) |
| *F16L 27/08* | (2006.01) |
| *A01C 23/04* | (2006.01) |
| *A01B 73/00* | (2006.01) |

(52) U.S. Cl.
CPC .............. *A01C 7/082* (2013.01); *A01B 73/00* (2013.01); *A01C 23/04* (2013.01); *F16L 27/0849* (2013.01)

(58) Field of Classification Search
CPC .......... F16L 27/0804; F16L 27/0841; F16L 27/0849
See application file for complete search history.

(56) References Cited

U.S. PATENT DOCUMENTS

| | | | | |
|---|---|---|---|---|
| 7,309,035 | B2 * | 12/2007 | Korus | A01G 25/092 239/722 |
| 2008/0303268 | A1 * | 12/2008 | Puck | A01C 23/021 285/62 |
| 2015/0345678 | A1 * | 12/2015 | Nourian | F16L 23/04 285/184 |

FOREIGN PATENT DOCUMENTS

| | | |
|---|---|---|
| CN | 200952617 Y | 9/2007 |
| CN | 101936435 A | 1/2011 |

OTHER PUBLICATIONS

Sun Rise Group, L-Swivel Hose Nipple Product Page, Admitted Prior Art.
Fitting House, Swivel Joints Series, Product Page, Admitted Prior Art.
Offers Check Co.UK, Wickes 1.5m Blue Washing Machine Hose Product Page, Admitted Prior Art.
Rototech Rotating Joints, 4000 Series Hose Installations Page, Admitted Prior Art.
Showa Giken Industrial Co., Ltd., Pearl Swivel Joints SJ-30/e Catalog, Admitted Prior Art.
SJ Construction, Pearl Swivel Joints Product Page, Admitted Prior Art.

(Continued)

*Primary Examiner* — James M Hewitt, II
(74) *Attorney, Agent, or Firm* — Klintworth & Rozenblat IP LLP

(57) ABSTRACT

A rotational joint is provided for an agricultural machine having hinged frame sections, each frame section carrying one or more plumbing lines for moving a carrier fluid. The rotational joint includes first and second joint parts. Each joint part has a coupler defining a flow passage leading to an interface opening. The joints parts are coupled to allow for relative rotation about a rotation axis passing through the interface openings. In at least one angular orientation of the (Continued)

joint parts, the flow passages of the couplers are in fluid communication.

18 Claims, 9 Drawing Sheets

(56) References Cited

OTHER PUBLICATIONS

Tokyo Boeki Machinery, Energy Industries Division, Niigata Swivel Joints, Product Page, Admitted Prior Art.
Ultimate Handy Man, Self Cutting Tap How to Install a Self Cutting Tap Page, Admitted Prior Art.
Elkhart Brass MFG. Co., Inc., Sidewinder EXM Mo. 7100, Product Page, Admitted Prior Art.

* cited by examiner

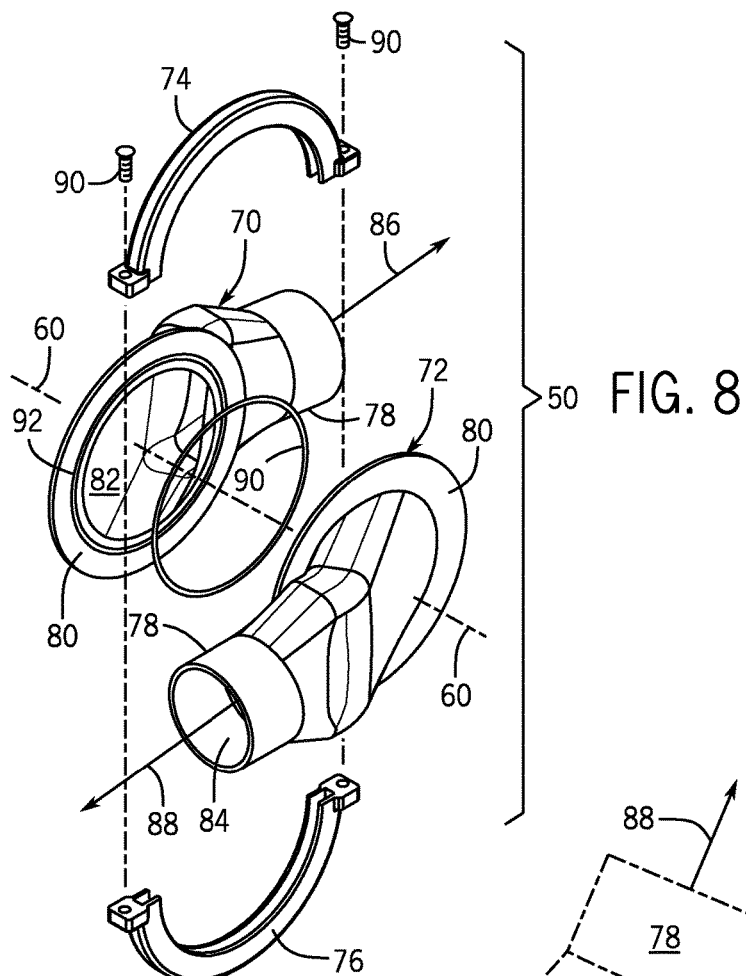
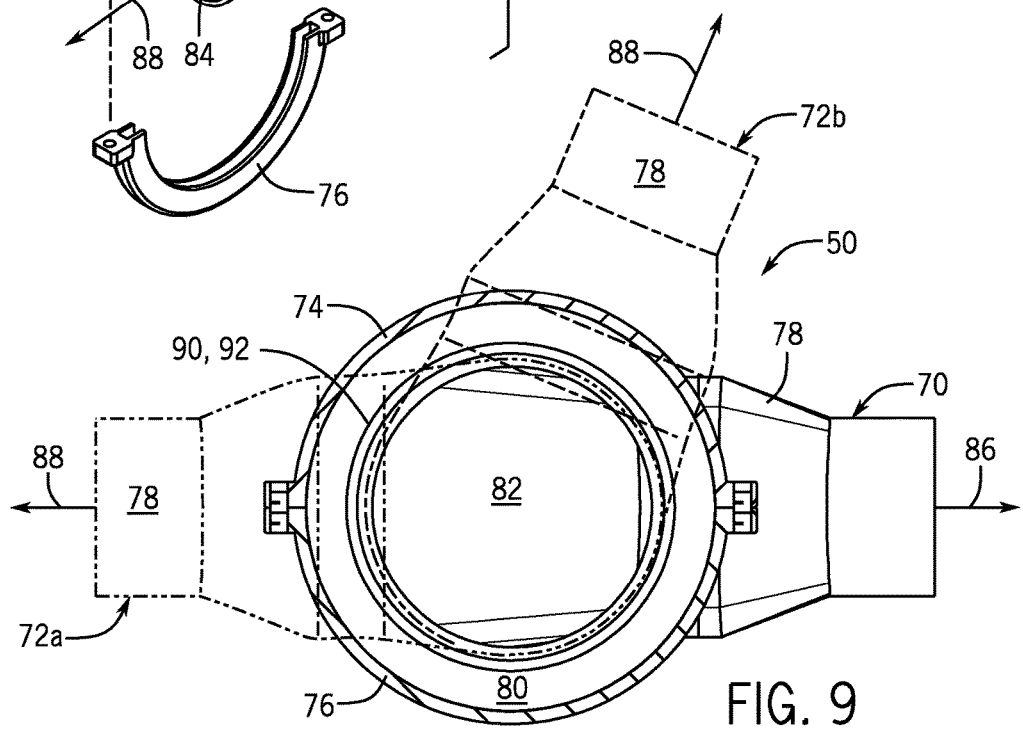

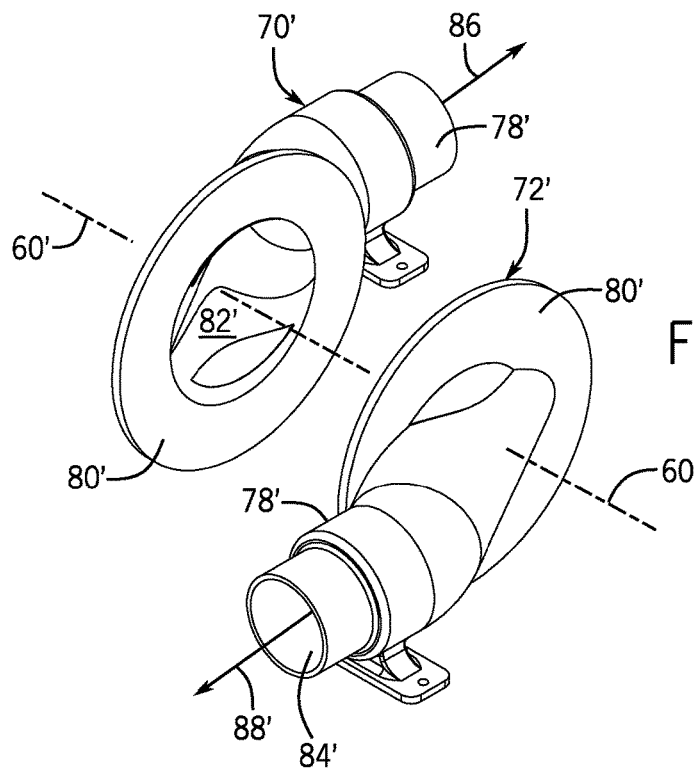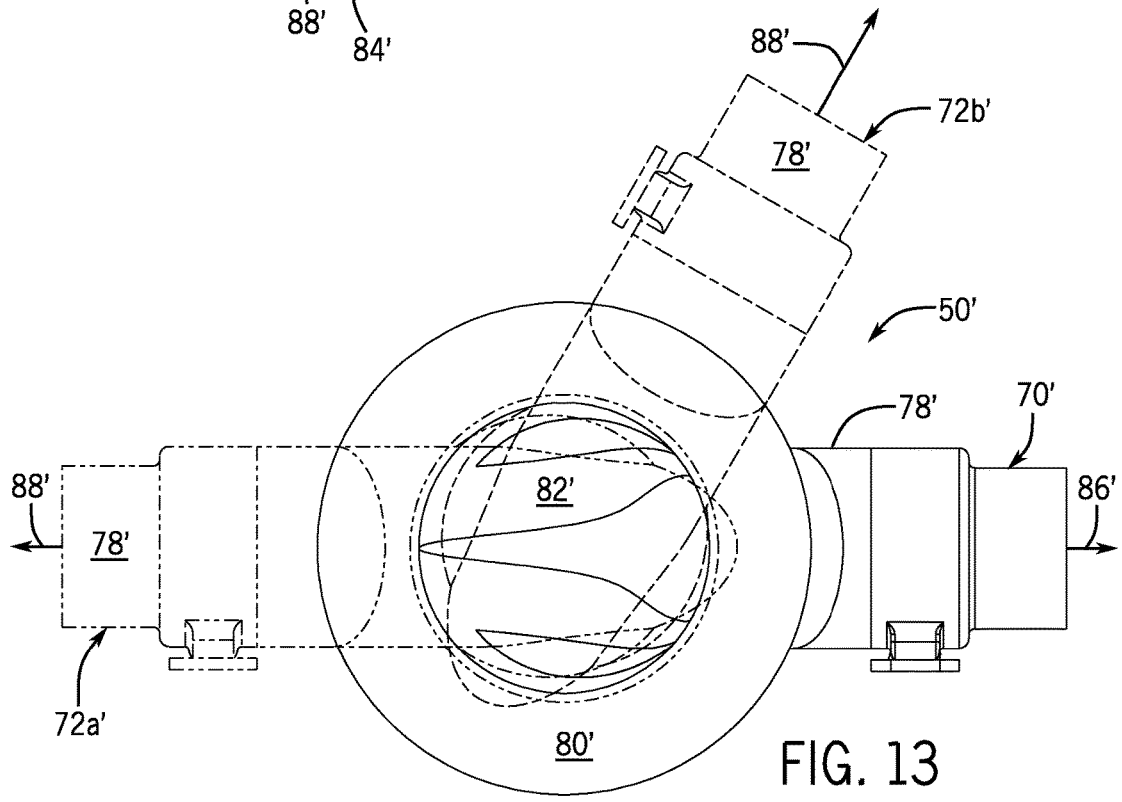

US 10,420,274 B2

ROTATIONAL FLUID JOINT FOR AGRICULTURAL MACHINE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to agricultural machines with hinged sections carrying plumbing lines for conducting a carrier fluid in which one or more agricultural commodities are entrained.

BACKGROUND OF THE DISCLOSURE

Various work machines and implements may have hoses or other plumbing lines used to deliver material from one part of the machine to another. In the agriculture industry, for example, agricultural material (e.g., nutrients and pesticides) may be sprayed onto a field by a self-propelled sprayer machine, and various commodities (e.g., seeds and fertilizers) may be planted or otherwise deposited into the ground using an air distribution system. The air distribution system may be contained on a single machine or extend across multiple platforms. By way of example, the air distribution system may be part of a vehicle train including a self-propelled tractor towing a commodity cart and a seeding machine, in which case the air distribution system may deliver commodity from supply containers on the commodity cart to one or more planting units of the seeding machine, which then dispenses the commodity into the ground.

Air seeding machines, for example, may be configured to cover a wide swath of field in a single pass. Large-scale air seeding machines may have five or more sections, including a main frame and inner and outer wings at each side of the main frame. To allow the machines to be transported on roadways, the wings may be hinged to the main frame so that they may fold up over the main frame and fit within a prescribed transport width dimension.

SUMMARY OF THE DISCLOSURE

This disclosure provides a rotational joint that may be useful to join plumbing lines mounted to hinged sections of an agricultural machine.

Specifically, in one aspect the disclosure provides a rotational joint for an agricultural machine having a first frame section hinged to a second frame section. The frame sections may each carry one or more plumbing lines for moving a carrier fluid. The rotational joint may include two joint parts. A first joint part has a first coupler defining a first flow passage leading to a first interface. A second joint part has a second coupler defining a second flow passage leading to a second interface opening. The first joint part is coupled to the second joint part to allow for relative rotation about a rotation axis passing through the first and second interface openings. In at least one angular orientation of the first and second joint parts, the first flow passage of the first coupler is in fluid communication with the second flow passage of the second coupler.

In another aspect the disclosure provides an agricultural machine including first and second frame sections. The first frame section may have a first plumbing line in which a carrier fluid is moved. The second frame section may be coupled to the first frame section along a hinge axis and have a second plumbing line in which the carrier fluid is moved. A rotational joint may have a first joint part with a first coupler connected to the first plumbing line of the first frame section and a second joint part with a second coupler connected to the second plumbing line of the second frame section. The first and second joint parts may be connected to one another to allow for relative rotation about a rotation axis which is coaxial with the hinge axis. The rotational joint may be configured so that, at least when the first frame section is in an operational state substantially parallel to the second frame section, a first flow passage of the first coupler is in fluid communication with a second flow passage of the second coupler to pass carrier fluid from the first plumbing line of the first frame section to the second plumbing line of the second frame section.

The details of one or more embodiments are set forth in the accompanying drawings and the description below. Other features and advantages will become apparent from the description, the drawings, and the claims.

BRIEF DESCRIPTION OF THE DRAWINGS

FIG. 8 is an exploded perspective view thereof;

FIG. 9 is a side sectional view thereof showing in phantom line one part of the joint in two angular positions;

FIG. 12 is an exploded perspective view thereof;

FIG. 13 is a side view thereof showing in phantom line one part of the joint in two angular positions;

Like reference symbols in the various drawings indicate like elements.

DETAILED DESCRIPTION

Figure 1:
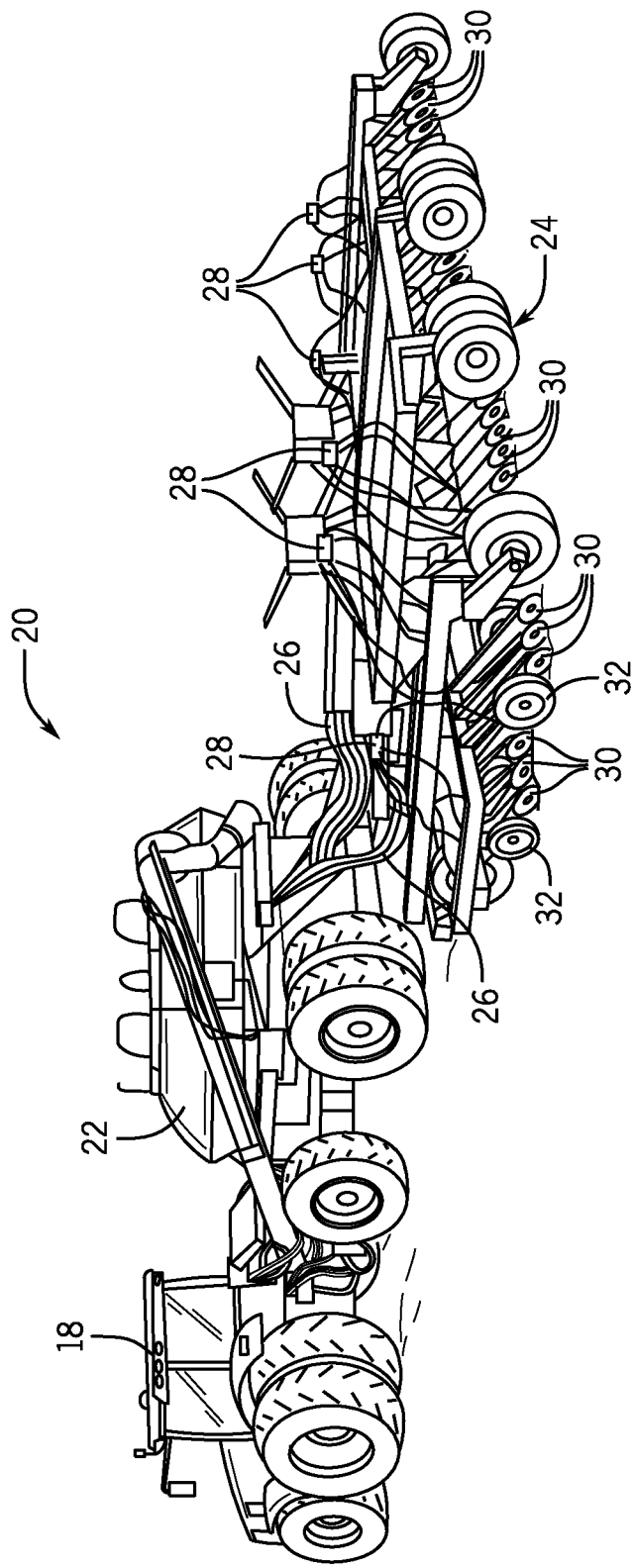
FIG. 1 is a simplified rear perspective view of an example agricultural vehicle train including a tractor, a commodity cart and a commodity distribution machine (e.g., an air seeding or planting implement) in which a rotational joint according to this disclosure may be useful.

The following describes one or more example embodiments of the disclosed rotational fluid joint and commodity distribution machine (e.g., air seeding implement), as shown in the accompanying figures of the drawings described briefly above. Various modifications to the example embodiments may be contemplated by one of skill in the art.

The following describes rotational fluid joints well-suited for joining selected plumbing lines of commodity distribution systems utilized to disperse seed, fertilizer, and other agricultural commodities entrained in a carrier fluid. Commodity distribution systems of this type commonly include a multi-section commodity distribution machine, which is towed or otherwise moved to spread one or more commodities across a swath of land during operation of the system. The sections of the commodity distribution machine may be joined by hinge couplings, which enable adjoining sections to pivot or flex for better ground following, or conformity with the ground topology over which the distribution machine travels. The hinge couplings may also enable the commodity distribution machine to fold along multiple hinge axes to transition to a non-operational, transport state having a reduced width better suited for roadway transport. The commodity distribution system further includes a network of plumbing lines, which conduct a carrier fluid in which the commodities are entrained. The carrier fluid can be any suitable liquid or gas and, in one embodiment, is pressurized air. The plumbing lines may extend from the commodity cart to a central portion of the commodity distribution machine and then extend laterally to the various hinged sections of the machine. As a result, the plumbing lines can potentially restrict the pivoting motion between the adjacent hinged sections of the distribution machine if adequate measures are not taken. Thus, in traditional routing schemes, wherein the plumbing lines are continuous lengths of tubing or hosing, slack is provided in each plumbing line at the hinged junctures between adjacent hinged sections to avoid interference with the pivoting motion between the hinged sections. This approach is, however, limited in a number of respects. For example, the excess plumbing line length and the associated mounting hardware may increase the overall weight and cost of the commodity distribution system. The likelihood of undesired accumulation of solids within plumbing lines is also increased due, at least in part, to the introduction of additional bends in the plumbing lines and an increase in overall plumbing line length. Furthermore, even when carefully mounted to the frame of the commodity distribution machine, the excess plumbing line length may still potentially interfere with pivoting movement between adjacent hinged sections and obstruct, abrade against, or otherwise physically interact with other components carried by the distribution machine in an undesired manner. Kinking or damage to the plumbing lines is also possible.

The above-noted limitations associated with conventional plumbing line routing schemes may be mitigated or wholly overcome by virtue of the rotational fluid joints described herein. As described more fully below, embodiments of the rotational fluid joints enable the conduction of commodity-entrained airstreams across the hinged joints of a commodity distribution machine, while allowing adjoining hinged sections to rotate through a relatively broad angular range of motion. In so doing, the rotational fluid joints enable the commodity distribution machine to rotate about the hinge axes without binding and without damage to the rotational fluid joints, to the plumbing lines, or to other distribution machine components. Notably, embodiments of the rotational fluid joints may provide such a rotatable fluid coupling between plumbing lines even when the plumbing lines extend laterally and, therefore, substantially perpendicular to the hinge axes of the commodity distribution machine. Embodiments of the rotational fluid joints described herein may also enable a relatively tight longitudinal packing of the rotational fluid joints in multi-joint banks positioned along the hinge axes of the commodity distribution machine. Various other benefits may also be realized by integrating embodiments of the rotational fluid joints into a commodity distribution machine of the type described herein. Such benefits may include, but are not limited to, a decrease in the bends or kinks in the plumbing lines, a reduction in overall plumbing line length, a decreased likelihood of physical interference with neighboring components carried by a commodity distribution machine, and an improved retention of the plumbing lines at the fold joints of the commodity distribution machine.

Several example embodiments of rotational fluid joints suitable for conducting commodity-entrained airstreams are described below in conjunction with FIGS. 4-15. First, however, a general description is provided of an example commodity distribution machine in which embodiments of the rotational fluid joints may be usefully integrated. In the below-described example, the commodity distribution machine is included within a larger commodity distribution system, which utilizes pressurized air to carry and disperse agricultural commodities, such as a seeds and fertilizer. The following description is offered by way of non-limiting example only to establish an illustrative context in which embodiments of the rotational fluid joints may be better understood. It is emphasized that embodiments of the rotational fluid joints may be usefully integrated into various other types of fluid-conducting commodity distribution machines and other agricultural fluid dispersal systems wherein it is desired to conduct one or more commodity-entrained fluid streams across two structures between which pivoting or rotational movement is permitted.

A particular example of a commodity distribution system 20 is depicted in FIG. 1 to include a commodity cart 22 and a multi-section implement 24. In this particular example, the commodity distribution system 20 and the multi-section implement 24 utilize pressurized airstreams to carry and disperse one or more agricultural commodities. For this reason, the commodity distribution system 20 may be referred to hereafter as an "air commodity distribution system 20," while the multi-section implement 24 may be referred to an air commodity distribution machine 24 or, more simply, an "ACD machine 24." In certain embodiments, the ACD machine 24 may take the form of a seeding or planting implement, for dispensing seed, fertilizer or other agricultural materials into the ground. In the illustrated example, the main plumbing lines 26 extend from the commodity cart 22 to a group of the distribution towers 28 mounted to the ACD machine 24. Plumbing lines 26 may each include any number of fluidly-connected conduits, such one or more lengths of flexible tubing, flexible hosing, and/or rigid piping. The distribution towers 28 feed a network of smaller secondary plumbing lines, which extend from the towers 28 to an array of the commodity deposition tubes 30 (only a few of which are labeled in FIG. 1) mounted to each row unit. The row units are mounted at selected locations across the body of the ACD machine 24 in a desired spatial array, such as a series of laterally-spaced rows. The row units are further equipped with a number of ground-engaging tools 32 (only a few of which can be seen) in FIG. 1, which assist in the planting or deposition of the seed and/or other agricultural commodities supplied by the commodity cart 22 in a well-known manner.

During operation of the commodity distribution system 20, the commodity cart 22 and the ACD machine 24 are towed by a tractor 18 or otherwise moved across a swath of field. The commodity cart 22 directs pressurized, commodity-entrained airflow into the main plumbing lines 26 as a number of separate airstreams. The commodity cart 22 may supply any practical number of separate airstreams, which may carry the same or different types of commodities. In some embodiments, the commodity cart 22 simultaneously entrains seed and fertilizer into separate airstreams directed into different ones of the plumbing lines 26. The commodity-entrained airstreams flow through the main plumbing lines 26 to the distribution towers 28 mounted to the ACD machine 24. In some embodiments, a single plumbing line 26 will supply each distribution tower 28 with a single commodity-entrained airstream; however, this need not be the case in all embodiments. The distribution towers 28 serve as manifolds, which divide the commodity-entrained airstreams amongst the smaller, secondary plumbing lines connected to the commodity deposition tubes 30. When receiving the commodity-entrained airstreams, the commodity deposition tubes 30 deposit (or plant) the commodity in the soil, while venting the pressurized airstream to the ambient environment. In certain cases, the commodity deposition tubes 30 may direct the seed, fertilizer, and/or other commodities into furrows created by the ground-engaging tools 32 as the ACD machine 24 moves across the ground.

The wingspan of the ACD machine 24 may be broad to dispense commodities across a correspondingly wide swath of field during operation of the commodity distribution system 20. The ACD machine 24 may also be capable of transitioning to a relatively laterally-compact state facilitating roadway transport when non-operational. To satisfy these competing criteria, the ACD machine 24 may include to a number of hingedly-coupled sections, which enable the ACD machine 24 to fold into a laterally-compact transport state when not in use. An example of the manner in which the ACD machine 24 may transition into a folded transport state is described below in conjunction with FIG. 2. In the following description, terms of direction and orientation, such as "forward," "aft," "lateral," "horizontal," and "vertical," are used. Such terms are defined, at least in part, with respect to the direction in which the ACD machine 24 is towed or is otherwise moved during usage. As appearing herein, the term "forward" and the abbreviated term "fore" refer to a direction corresponding to the travel direction of the ACD machine 24, while the term "aft" refers to an opposing direction. The term "fore-aft axis" is also utilized in reference to an axis extending in fore and aft directions (corresponding to the Y-axis identified in FIG. 2 by coordinate legend 44). By comparison, the term "lateral axis" refers to an axis perpendicular to the fore-aft axis and extending in horizontal plane; that is, a plane parallel to the fore-aft axis and orthogonal to the centerline of multi-section implement 24 (corresponding to an X-Y plane in coordinate legend 44). Finally, the term "vertical," as appearing herein, refers to an axis or a direction orthogonal to a horizontal plane and parallel to the centerline of multi-section implement 24 (corresponding to Z-axis in coordinate legend 44).

Figure 2:
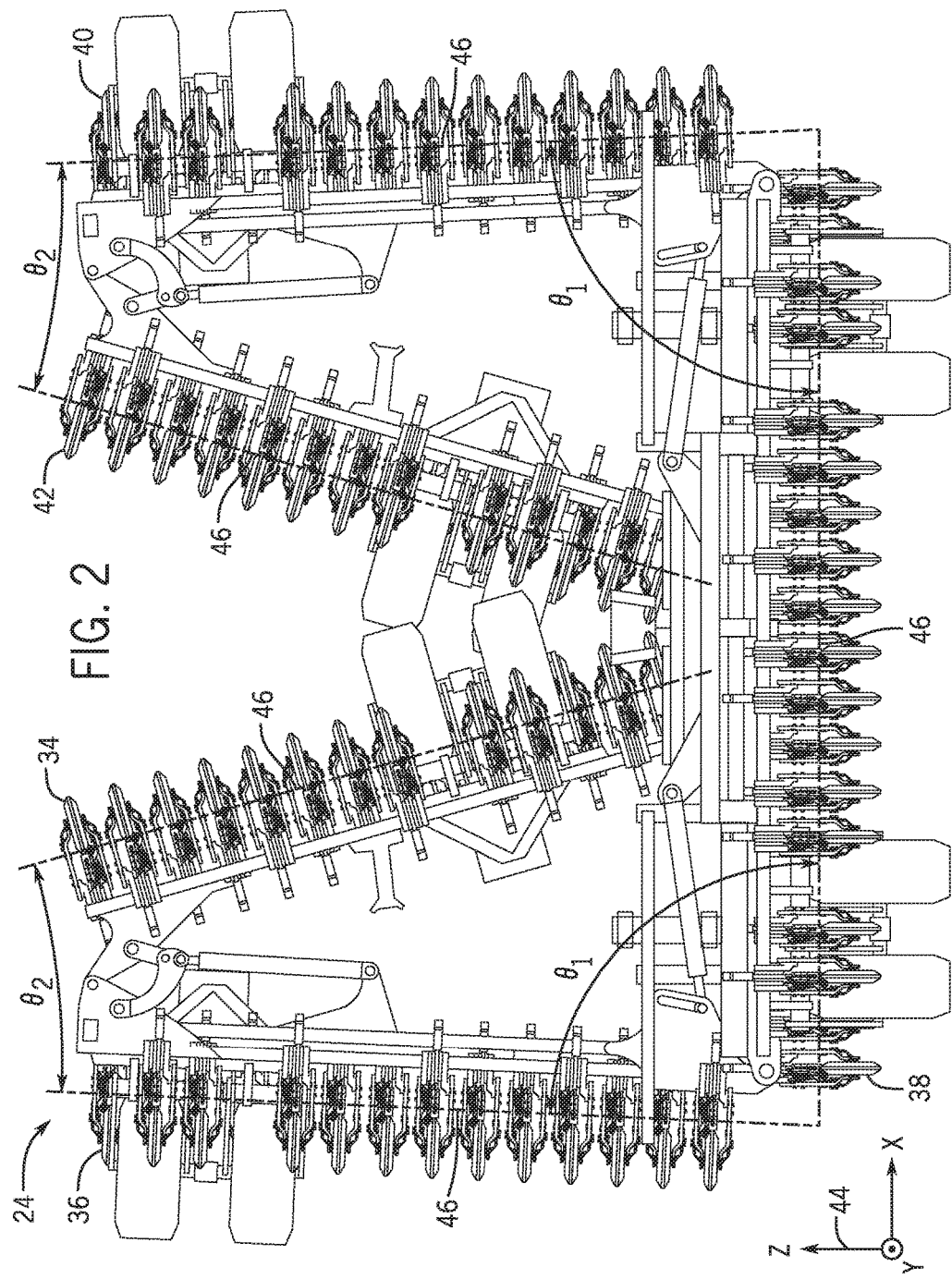
FIG. 2 is end view of the example the commodity distribution machine of FIG. 1, shown in a transport position with inner and outer wings folded.

Turning to FIG. 2, the ACD machine 24 is illustrated in a folded transport state. Here it can be seen that the ACD machine 24 includes five adjoining frame sections: (i) a first outer wing section 34, (ii) a first inner wing section 36, (iii) a main frame section 38, (iv) a second inner wing section 40, and (v) a second outer wing section 42. The inner wing sections 36 and 40 are hinged to opposing lateral sides of main frame section 38 and may thus rotate or pivot with respect to main frame section 38 about parallel hinge axes or "fold lines." The hinge axes extend in essentially fore-aft directions, which are orthogonal to the plane of the page in FIG. 2 and which correspond to the Y-axis identified by coordinate legend 44. Similarly, the outer wing sections 34 and 42 are hinged to the outboard sides of the inner wing sections 36 and 40, respectively. The outer wing sections 34 and 42 may thus likewise pivot or rotate relative to the inner wing sections 36 and 40, respectively, about fore-aft hinge axes. Such a foldable configuration enables the ACD machine 24 to transition from the unfolded operational state shown in FIG. 1 to the folded transport state shown in FIG. 2 for ease of roadway transport. In further embodiments, the ACD machine 24 may include a greater or lesser number of wing sections, which may be hinged in various other foldable configurations.

Figure 3:
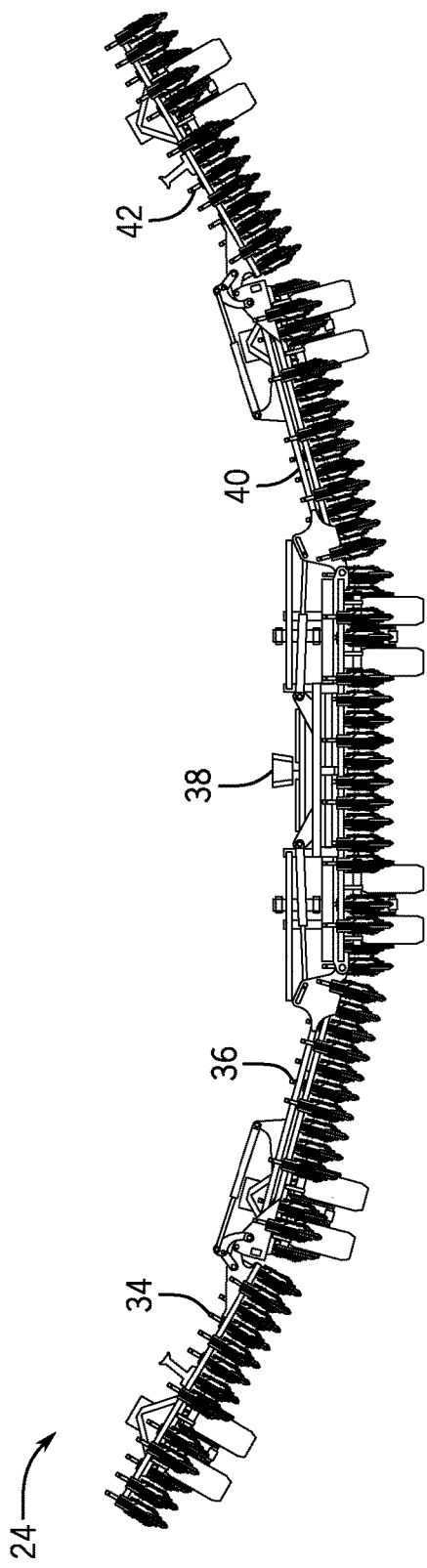
FIG. 3 is an end view thereof showing in an operational position with the inner and outer wings unfolded and with an upwardly flexed orientation.
Figure 4:
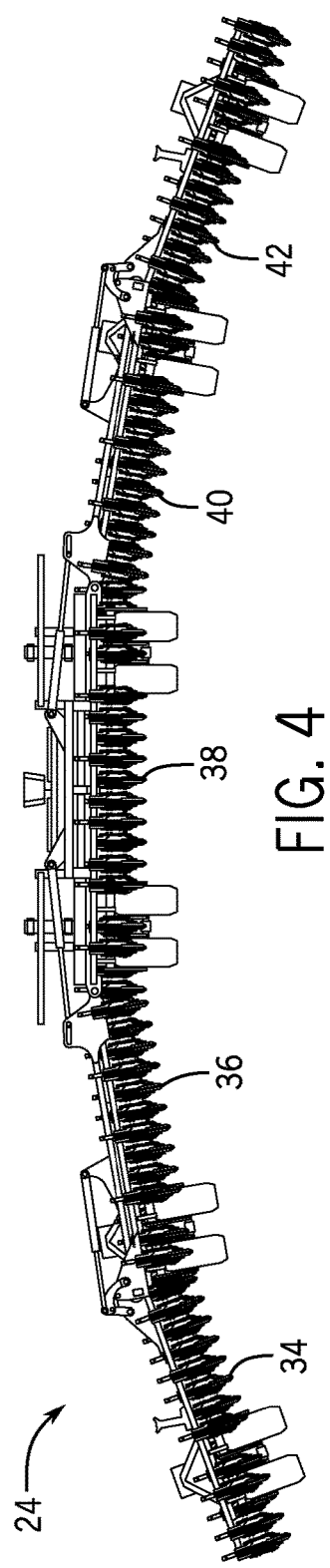
FIG. 4 is a view similar to FIG. 3 with the inner and outer wings shown in a downwardly flexed orientation.

As shown in FIG. 2, dashed lines 46 represent the respective lateral axes of the sections 34, 36, 38, 40, and 42. The lateral axes of the inner wing sections 36 and 40 each form an angle $\theta_1$ with the lateral axis of the main frame section 38. The lateral axes of the outer wing sections 34 and 42 also form an angle $\theta_2$ with the lateral axes of the inner wing sections 36 and 40, respectively. When the ACD machine 24 is its unfolded operational stated and located on a substantially flat ground, angles $\theta_1$ and angles $\theta_2$ may each be approximately 180 degrees. Conversely, angles $\theta_1$ and angles $\theta_2$ may each be substantially less than 180 degrees when the ACD machine 24 is in its folded transport state. To provide a more specific and non-limiting example, angles $\theta_1$ may each be slightly less than 90 degrees, while angles $\theta_2$ are each approximately 35 degrees when the ACD machine 24 is in the folded transport state shown in FIG. 2. The hinge couplings joining the sections 34, 36, 38, 40, and 42 are thus imparted with a relatively broad angular range to allow the ACD machine 24 to transition between these two states. Additionally, the hinge couplings between the sections 34, 36, 38, 40, and 42 may also usefully permit the ACD machine 24 to flex upwardly, to flex downwardly, or otherwise flex along its width to better follow non-planar or irregular ground topologies. For example, as indicated in FIG. 3, the hinge couplings joining the sections 34, 36, 38, 40, and 42 may allow the ACD machine 24 to bow in an upward direction when traveling over a relatively shallow valley or a concave ground slope. Conversely, as indicated in FIG. 4, the hinge couplings joining the sections 34, 36, 38, 40, and 42 may allow the ACD machine 24 to bow in a downward direction when traveling over a small hill or a convex ground slope.

Figure 5:
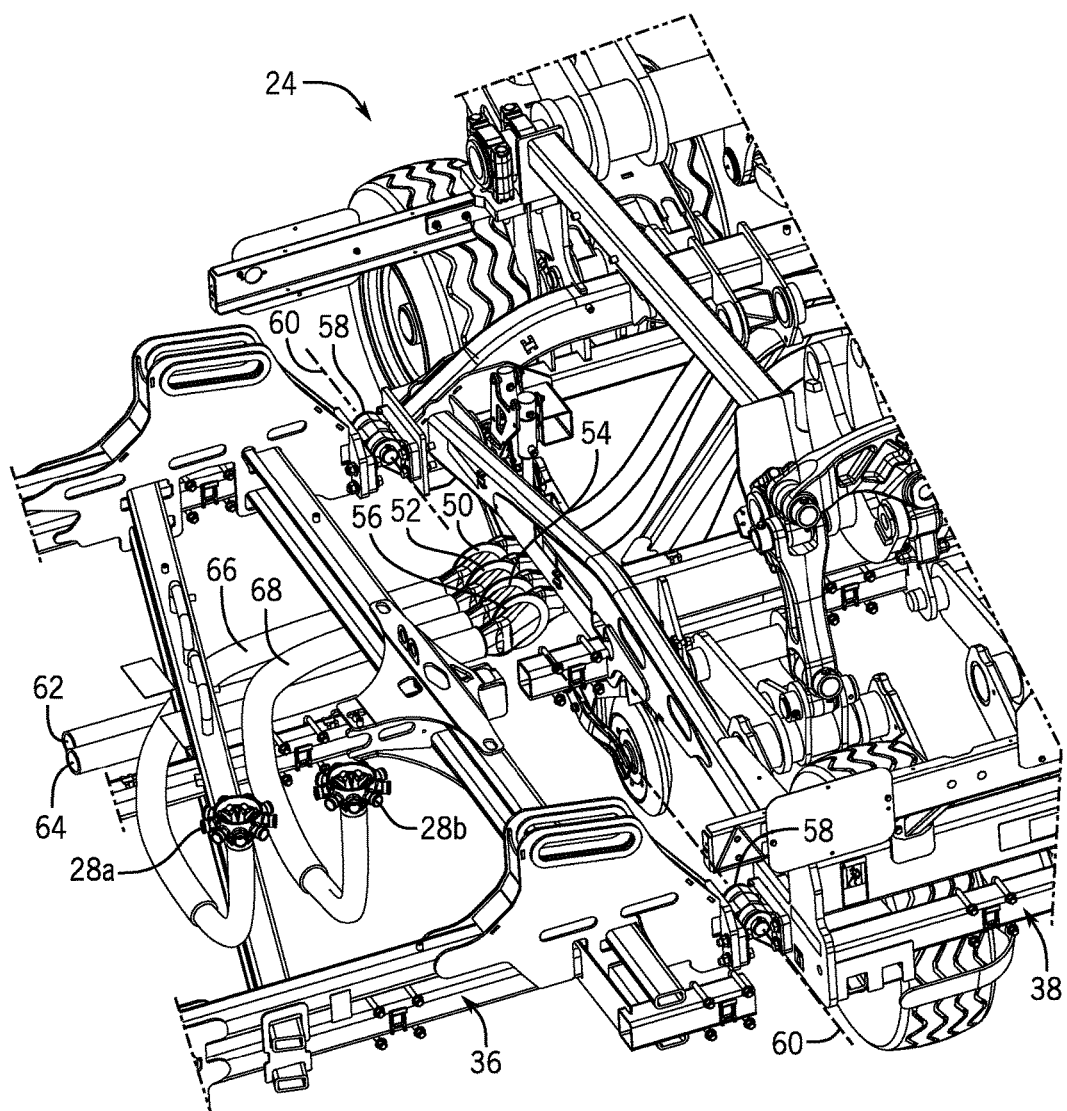
FIG. 5 is a partial perspective view showing a bank of rotational joints mounted between along a hinge axis where one of the inner wings is joined to a main frame of the air commodity distribution machine of FIG. 1.

Referring also FIG. 5, the hinged juncture between inner wing section 36 and main frame section 38 will now be described in greater detail. Here it can be seen that hinge joints 58 couple the inner wing section 36 to the main frame section 38 to allow relative pivotal motion between these two sections about a hinge axis 60. As can further be seen in FIG. 5, four main plumbing lines 62, 64, 66, and 68 extend from the main frame section 38, laterally across the hinge axis 60, and to the inner wing section 36. Specifically, the main plumbing lines 66 and 68 extend to two distribution towers 28a and 28b, which are mounted to the framework of inner wing section 36 in a side-by-side relationship. The distribution towers 28a, 28b each further connect to a plurality of secondary plumbing lines (not shown for clarity), which, in turn, connect to the commodity deposition tubes 30 (FIG. 1) mounted to the inner wing section 36. Comparatively, the main plumbing lines 62 and 64 extend beyond the illustrated area of the ACD machine 24 in a lateral direction toward the outer wing section 34 (to the left in FIG. 5). The non-illustrated downstream portions of the plumbing lines 62 and 64 may extend to additional distribution towers mounted to either the inner wing section 36 or to the outer wing section 34.

The ACD machine 24 is further equipped with a plurality of rotational fluid joints, which fluidly couple the conduits of the main plumbing lines 26 at the hinged junctures between adjacent the hinged sections 34, 36, 38, 40, and 42. Four such rotational fluid joints can be seen in FIG. 5 and are identified by reference numerals "50," "52," "54," and "56." The rotational fluid joints 50, 52, 54, and 56 are arranged in a multi-joint row or bank, which extends along the hinged juncture between the inner wing section 36 and the main frame section 38 of the ACD machine 24. The rotational fluid joints 50, 52, 54, and 56 serve to fluidly couple or connect corresponding pairs of conduits included in the main plumbing lines 62, 64, 66, and 68. While the following description focuses on the rotational fluid joints, plumbing lines, and other structural features located at the hinged juncture between the inner wing section 36 and the main frame section 38, it will be appreciated that similar or identical structural features may likewise be provided at the hinged junctures between the other hinged sections of the ACD machine 24. The following description, then, is equally applicable to rotational fluid joints, plumbing lines, and other structural features located at the hinged junctures between the outer wing section 34 and the inner wing section 36, between the main frame section 38 and the inner wing section 40, and between the inner wing section 40 and the outer wing section 42.

Figure 6:
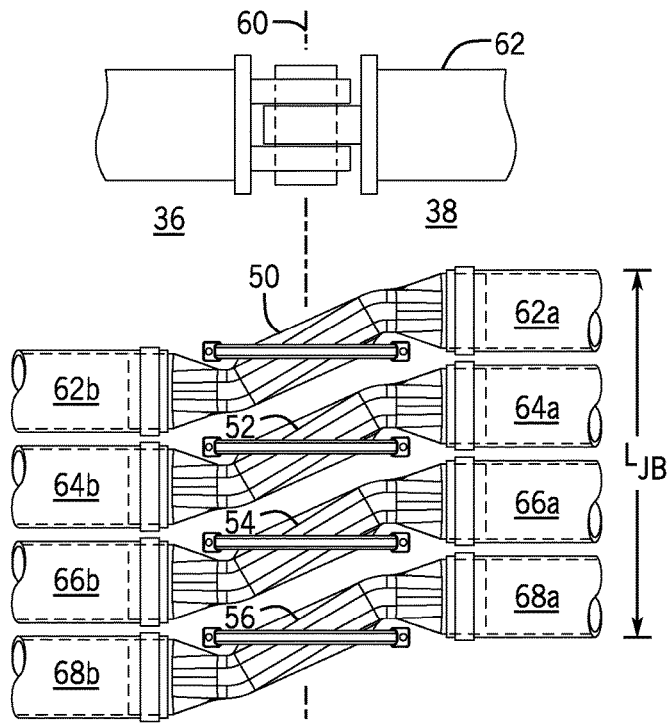
FIG. 6 is a partial top view showing a bank of four rotational joints having one example configuration.

Referring also to FIG. 6, the rotational fluid joints 50, 52, 54, and 56 may be arranged in a multi-joint row or bank spaced along the hinge axis 60 and, more generally, along the hinged juncture between the inner wing section 36 and the main frame section 38. FIG. 6 is schematic in that the hinge couplings 58 are graphically displaced from their true positions (shown in FIG. 5) for purposes of illustration. In FIG. 6 and in subsequent drawing figures, a numbering scheme is utilized wherein the conduits making-up or included within a particular plumbing line are identified by letters succeeding the reference numeral corresponding to the plumbing line. In accordance with this numbering scheme, the plumbing line 62 includes a first conduit 62a and a second conduit 62b, which are fluidly coupled by the rotational fluid joint 50. Similarly, the plumbing line 64 includes a first conduit 64a and a second conduit 64b, which are fluidly coupled by the rotational fluid joint 54. The plumbing line 66 includes a first conduit 66a and a second conduit 66b, which are fluidly coupled by the rotational fluid joint 54. Finally, the plumbing line 68 includes a first conduit 68a and a second conduit 68b, which are fluidly coupled by the rotational fluid joint 56. The interconnected conduits of the plumbing lines 62, 64, 66, and 68 may be flexible tubing, hoses, piping, or any other structure or component suitable for conducting commodity-entrained fluid streams (e.g., commodity-entrained airstreams) of the type described herein.

The rotational fluid joints 50, 52, 54, and 56 each permit rotation between the connected conduits about a rotation axis. In the illustrated example, the rotational fluid joints 50, 52, 54, and 56 are arranged such that the respective rotation axes thereof are substantially coaxial with each other and with the hinge axis 60. Thus, the rotation axes of rotational fluid joints 50, 52, 54, 56 and 60 are also generally represented by dashed line "60" in FIG. 6 and may be referred to hereafter as "rotation axis 60" or, in combination with hinge axis 60, as "hinge/rotation axis 60." In certain example configurations, the rotational fluid joints 50, 52, 54, 56 and 60 may be positioned longitudinally adjacent one another in a relatively tight longitudinal spacing such that the overall length of the four-joint bank (identified in FIG. 6 by double headed arrow $L_{JB}$) is minimized; the length of the joint bank taken in a fore-aft direction along the hinge/rotation axis 60, and the term "longitudinal" referring to an axis extending in fore and aft directions. The upstream conduits 62a, 64a, 66a, and 68a and the downstream conduits 62b, 64b, 66b, and 68b may likewise be positioned in a relatively tight grouping at the locations at which plumbing lines 62, 64, 66, and 68 cross-over from the main frame section 38 to the inner wing section 36. Additionally, as shown in FIG. 6, the conduits 62a, 64a, 66a, and 68a may be staggered relative to the corresponding conduits 62b, 64b, 66b, and 68b, as taken along the hinge/rotation axis 60. This may provide a relatively compact plumbing line routing scheme to provide clearance and additional mounting area for the other components carried by ACD machine 24.

Figure 7:
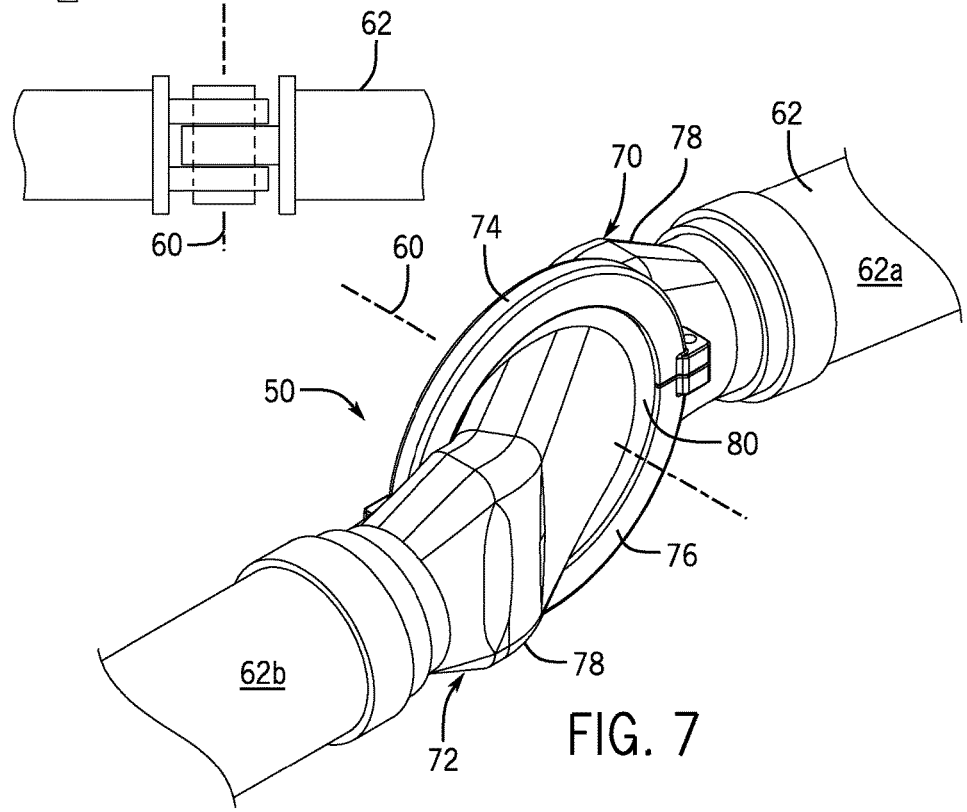
FIG. 7 is a partial perspective view showing one of the rotational joints of FIG. 6 in isolation.
Figure 10:
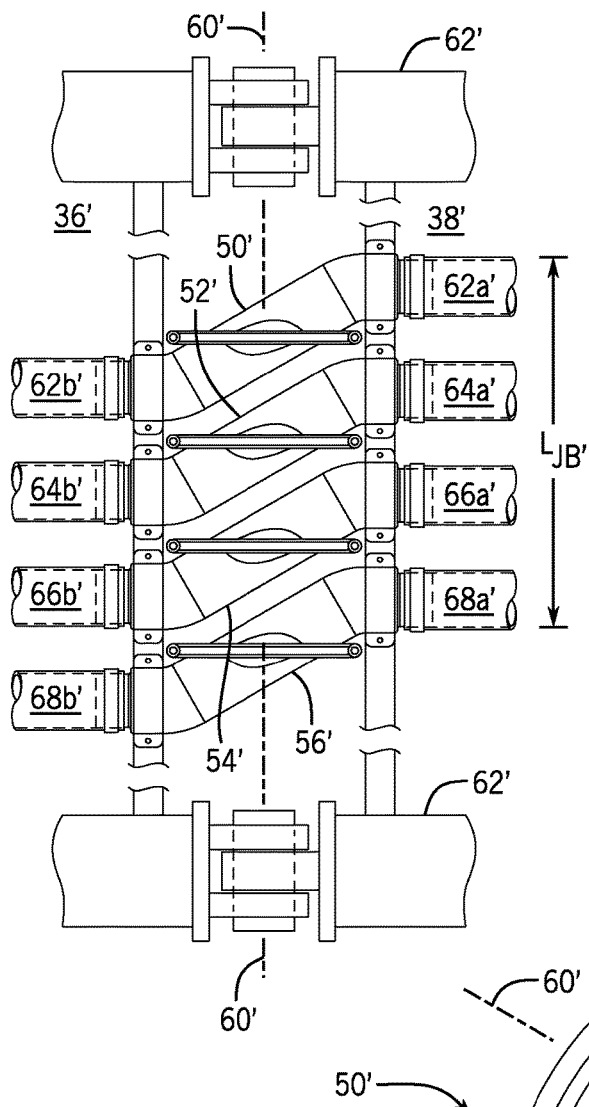
FIG. 10 is a view similar to FIG. 6 showing a bank of four rotational joints having another example configuration.
Figure 11:
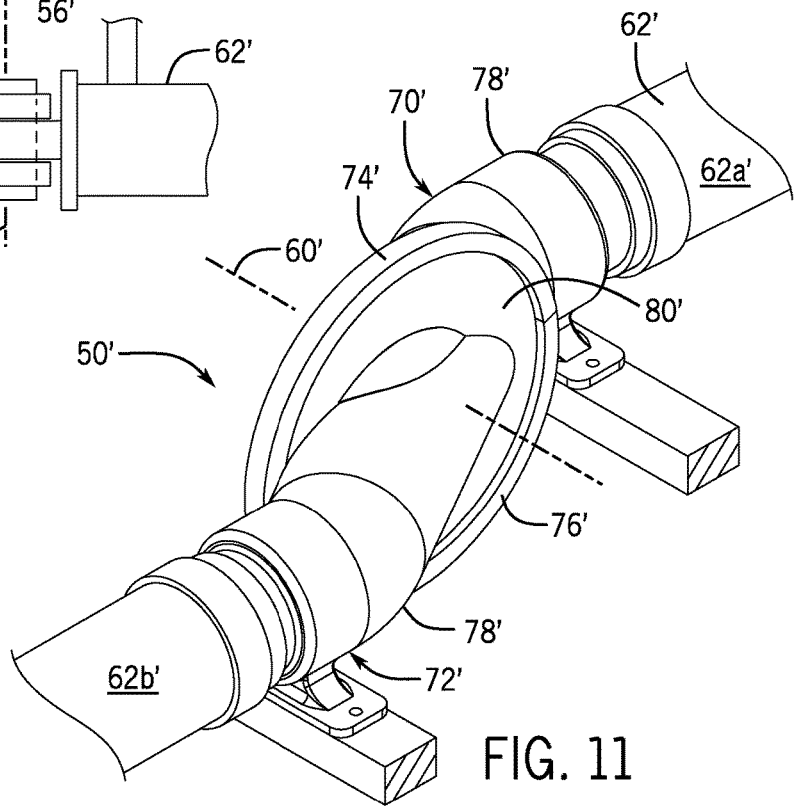
FIG. 11 is a partial perspective view showing one of the rotational joints of FIG. 10 in isolation.
Figure 14:
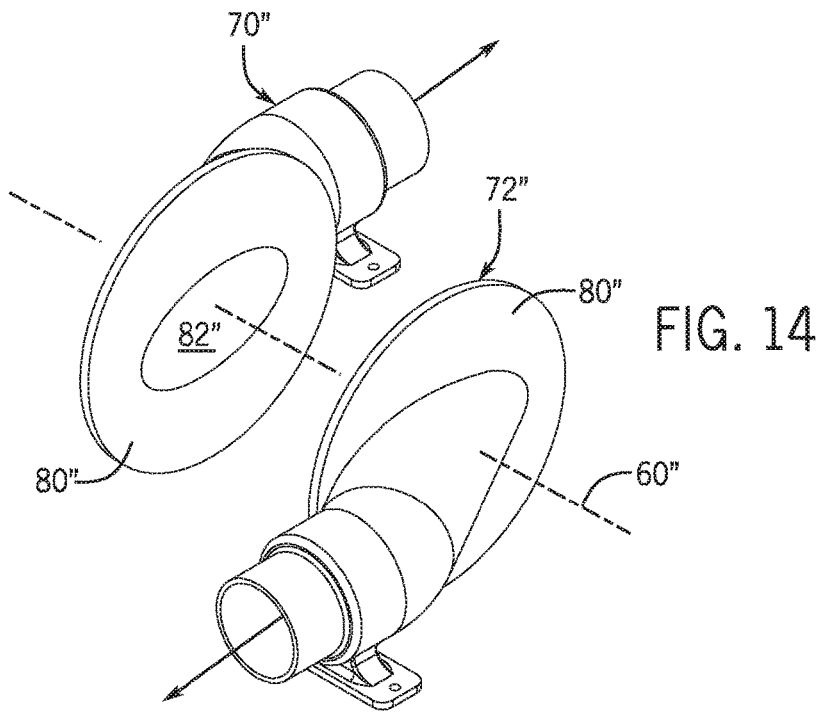
FIG. 14 is an exploded perspective view of a rotational joint similar to the example of FIG. 10, but having another example configuration with non-circular passages.
Figure 15:
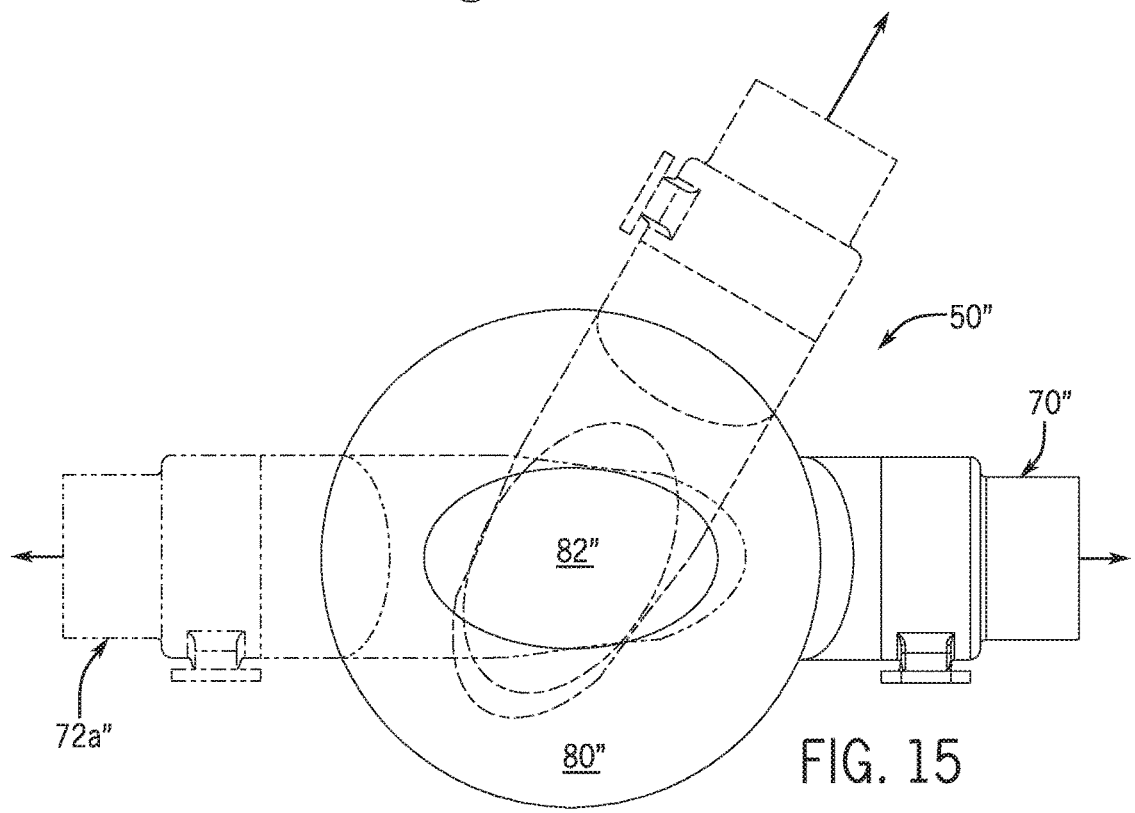
FIG. 15 is a side view thereof showing in phantom line one part of the joint in two angular positions.

Referring also to FIGS. 7 and 8, rotational fluid joint 50 is shown in greater detail. The rotational fluid joint 50 may be generally representative of the other rotational fluid joints (i.e., joints 52, 54, and 56) shown in FIGS. 5 and 6. Rotational fluid joint 50 includes a first joint part 70, a second joint part 72 adjacent joint part 70, and a split annular collar 74, 76 disposed around joint parts 70 and 72. Aside from their differing orientations, the first joint part 70 and the second joint part 72 are substantially identical in the illustrated example. Like reference numerals are thus utilized to denote like structural elements of the joint parts 70 and 72. The joint parts 70 and 72 each include a fluid coupling or "coupler" 78 through which a flow passage extends. A hub flange 80 projects radially from an end of the coupler 78 and defines an orifice or "interface opening" 82, which leads to the flow passage provided through the coupler 78. Stated differently, hub flanges 80 extend radially outward from interface openings 82. The flow passages provided through the joint parts 70 and 72 are fluidly coupled to the coupler openings 84 provided in the outer terminal ends of the couplers 78; that is, the ends of the couplers 78 opposite the hub flanges 80. The conduit 62a is inserted into, positioned around, or otherwise fluidly connected to the coupler opening 84 of the joint part 70 along a first conduit-coupling axis 86 (identified in FIG. 8) when the rotational fluid joint 50 is deployed within the ACD machine 24. Similarly, the conduit 62b is inserted into, positioned around, or otherwise fluidly connected to the coupler opening 84 of the joint part 72 along a second conduit-coupling axis 88 (FIG. 8).

When the rotational fluid joint 50 is incorporated into the ACD machine 24 (FIGS. 1-5), the hub flanges 80 circumscribe the hinge/rotational axis 60, which extends through the interface openings 82. The hub flanges 80 are maintained in the laterally abutting relationship by the annular collar 74, 76, which is installed around and circumscribes the hub flanges 80. Specifically, in the illustrated example, the annular collar 74, 76 includes two mating collar halves 74 and 76, which are joined around the hub flanges 80 utilizing bolts 90 (FIG. 8) or other such fasteners. The annular collar 74, 76 thus captures the hub flanges 80 in their desired abutting, co-axial relationship. If desired, the inner surfaces of the annular collar 74, 76 may be slanted or contoured to exert a controlled convergent pressure urging the hub flanges 80 against one another. In further embodiments, other types of annular collars may be utilized for this purpose including hinged V-band clamps having two or more arced sections. A fluid tight coupling is thus formed, which permits commodity-entrained air to flow from the conduit 62a into the coupler opening 84 of the joint part 70, through the interface opening 82 of the joint part 70, through the interface opening 82 of the joint part 72, through the coupler opening 84 of the joint part 72, and into the downstream conduit 62b. It should be understood that one or more O-rings, gaskets, or other seals, such as O-ring 90 set in grooves 92 formed in the hub flanges 80 (see FIGS. 8 and 9), may be positioned between the hub flanges 80 and the interior of the annular collar 74, 76, or compressed between the abutting faces of the hub flanges 80, to further deter leakage across this fluid coupling.

Referring also to FIG. 9, the rotational fluid joint 50 is depicted with the joint part 72 (shown in phantom) in two possible angular positions, as identified by reference numerals "72a" and "72b." The joint part 72 may rotate into position 72a when the ACD machine 24 transitions to the unfolded, operational state shown in FIG. 1. In position 72a, the conduit-coupling axis 88 of the hinge part 72 is substantially parallel to the conduit-coupling axis 86 of the hinge part 70. When the joint part 72 rotates into this position, the joint parts 70 and 72 may be referred to as "horizontally aligned." When the joint part 72 is in horizontally-aligned position 72a, the conduit-coupling axes 86 and 88 are substantially perpendicular to the axis 60, the coupler openings 84 face in opposing directions, and the couplers 78 extend in opposing directions from their respective hub flanges 80 to coupler openings 84. In contrast, in position 72b, the conduit-coupling axis 88 of the hinge part 72 forms an acute angle with respect to the conduit-coupling axis 86 of the hinge part 70, as taken in a clockwise direction. The joint part 72 may rotate into position 72b when the ACD machine 24 transitions into the folded, non-operational state shown in FIG. 2.

In a technical sense, the rotational fluid joint 50 may enable the joint part 72 to rotate beyond position 72b shown in FIG. 9 and possibly through an angular range approaching or exceeding 360 degrees. However, in embodiments wherein the rotational fluid joint 50 is positioned in a tightly spaced joint bank, such as the joint bank shown in FIGS. 5-6, rotation of the joint part 72 far beyond position 72b may be physically obstructed by the other rotational fluid joints included within the bank. In the case of the ACD machine 24, this is inconsequential as rotation of the joint part 72 beyond position 72b is unnecessary. If a broader rotational range is desired, the disposition of the rotational fluid joint 50 and any nearby rotational fluid joints (e.g., the rotational fluid joints 52, 54, and 56 shown in FIGS. 5-6) may be adjusted accordingly. In many embodiments, the joint part 72 will be rotatable with respect to the joint part 70 over an angular range of at least 180 degrees.

Fluid communication need not be provided between the flow passages of the joint parts 70 and 72 over the entire angular range of rotational fluid joint 50. It is desirable, however, for the rotational fluid joint 50 to provide substantially unimpeded, low leakage airflow (or other commodity-entrained fluid flow) over a sufficient "operational" angular range to optimize performance of the ACD machine 24 (FIGS. 1-5) during operation of the distribution system 20 (FIG. 1). The operational angular range of the rotational fluid joint 50 may vary amongst embodiments, but usefully encompasses at least the scenarios illustrated in FIGS. 3 and 4. In one embodiment, the operational angular range of the rotational fluid joint 50 and is at least ±15 degrees from the horizontally-aligned positions of the joint parts 70 and 72 shown in FIGS. 5-7 and in FIG. 9 at position 72a. Across this angular range, it is desired to minimize any protruding walls, sharp turns, or other such partial obstructions on which the commodity-entrained airstream impinges when flowing through the rotational fluid joint 50. For at least this reason, the respective interface openings 82 of the joint parts 70 and 72 are formed with circular peripheries, which align about hinge/rotational axis 60 (FIGS. 5-8) in all rotational positions of the joint parts 70 and 72. Stated differently, the interface openings 82 may be produced to have circular cross-sections substantially concentric with rotational axis 60. For optimal flow performance, the interface opening 80 of the joint part 72 has a cross-sectional area at least as large (e.g., equivalent to) the cross-sectional area of the interface opening 80 of the downstream joint part 70, as taken in a plane orthogonal to rotation axis 60.

In the above-described manner, the rotational fluid joint 50 provides a structurally-robust fluid coupling between the conduits 62a, 62b included in the main plumbing line 62. The conduits 62a, 62b extend laterally across the hinge/rotation axis 60 and may each extend substantially perpendicular thereto. To permit rotation of the rotational fluid joint to about the hinge/rotation axis 60, while fluidly connecting the laterally-extending conduits 62a, 62b, the coupler 78 of each joint part 70 and 72 may extend from its respective hub flange 80 at an acute angle and, perhaps, an angle less than 45 degrees. Such a structural configuration also helps to streamline any bends or turns through which the commodity-entrained airstream passes when flowing through the rotational fluid joint 50. Smooth, laminar airflow is thus promoted, while the likelihood of commodity accumulation within the rotational fluid joint 50 is reduced. For similar reasons, constrictions in cross-sectional flow area of the flow passage through rotational fluid joint 50 are also desirably avoided. Accordingly, the flow passages provided through the respective couplers 78 of the joint parts 70 and 72 are desirably imparted with cross-sectional flow areas equivalent to or greater than the cross-sectional flow areas of the conduits 62a, 62b. In the embodiment shown in FIGS. 5-9, specifically, the couplers 78 are produced to have non-circular (e.g., rectangular) flow bodies with a major dimension (e.g., height) oriented in a vertical direction and a minor dimension (e.g., width) oriented in a horizontal direction. As a result, the rotational fluid joint 50 may be produced to have a cross-sectional flow areas equivalent to or greater than the cross-sectional flow areas of the conduits 62a, 62b, while reducing the width of the joint 50 as taken along the rotational axis 60. This, in turn, permits the rotational fluid joint 50 to be positioned in a side-by-side relationship with other rotational fluid joints in a tightly-packed multi-joint bank, such as that shown in FIGS. 5 and 6.

There has thus been described one or more embodiments of a rotational fluid joint well-suited for joining the plumbing lines of commodity distribution systems, which utilizes pressurized airstreams or other fluid streams to disperse one or more agricultural commodities. While one or more particular examples of a rotational fluid joint was described above, various additional embodiments of the rotational fluid joint can be conceived without departing from the scope of the invention set-forth in the appended claims. This may be appreciated by referring to FIG. 10, which shows a bank of rotational fluid joints 50' illustrated in accordance with a further example embodiment of the present invention. One of the rotational fluid joints 50' is further illustrated in FIGS. 11-13. Many of the structural features of the rotational fluid joints 50' shown in FIGS. 10-13 are similar or identical to the features of the rotational fluid joint 50 described above in conjunction with FIGS. 4-9. Accordingly, like reference numerals are utilized to denote like features of the rotational fluid joints 50', but with the addition of a single prime symbol (') to indicate that such features may differ to varying extents. As can be seen, the rotational fluid joints 50' each include a first joint part 70', a second joint part 72', and an annular collar 74', 76'. Joint parts 70' and 72' each include, in turn, a coupler section 78' and hub flange 80', which extends radially from an end of coupler section 78' and which defines an interface opening 82'. The annular collar 74', 76' maintains the hub flanges 80' in an abutting, face-to-face relationship to permit relative rotation of the joint parts 70' and 72' about a rotation axis 60', as previously described. The interface openings 82' are placed in fluid communication and, once again, have circular peripheries concentric about the rotation axis 60'. However, in the case of the rotational hinge joint 50' shown in FIGS. 10-13, the coupler sections 78' each have a substantially circular cross-sectional geometry. The geometric complexities of the joint parts 70' and 72' are favorably reduced as a result, but with the corresponding penalty of an increase in joint length as taken along hinge/rotational axis 60'. Consequently, the overall length of the multi-joint bank containing the rotational fluid joints 50' (FIG. 10) is increased relative to the length of the multi-joint bank containing the more-compact rotational fluid joints 50 shown in FIGS. 5 and 6.

Alternative embodiments of the rotational fluid joints may be different in still further respects relative to the rotational fluid joint 50 shown in FIGS. 5-9 and relative to the rotational fluid joints 50' shown in FIGS. 10-13. For example, in further embodiments, the interface openings may have non-circular geometries and/or may not precisely align throughout the full angular range of the rotational fluid joint. This may be more fully appreciated by referring to FIGS. 14 and 15, which illustrate a rotational fluid joint 50" in accordance with yet a further example embodiment of the disclosure. Once again, like reference numerals are utilized to denote like structural features, but with the addition of a double prime symbol (") to indicate that the features of rotational fluid joint 50" may differ to varying extents as compared to the features of the rotational fluid joint 50 (FIGS. 4-9) or the rotational fluid joint 50' (FIGS. 10-13). In this particular example, the interface openings 82" provided in the hub flanges 80" of the joint parts 70" and 72" each have an oval or elliptically-shaped perimeter. As a result, and as shown most clearly in FIG. 15, the interface openings 82" do not precisely align about the rotation axis 60" in all rotational positions of the joint part 72" relative to the joint part 70". However, the interface openings 82" align when the joint parts 70" and 72" reside in the horizontally-aligned position corresponding to position 72a" in FIG. 15. Additionally, the interface openings 82" may align sufficiently over the operational angular range of the rotational fluid joint 50" (e.g., an angular range of ±15 degrees from the position 72a") to allow conduction of the commodity-entrained airstream with an acceptable level of impediment during operation of ACD machine 24 in some embodiments.

The foregoing has thus provided multiple example embodiments of rotational fluid joints well-suited for joining the plumbing lines of commodity distribution systems of the type utilized to disperse seed, fertilizer, and other agricultural commodities. Embodiments of the above-described rotational fluid joints advantageously enable the conduction of commodity-entrained fluid streams (e.g., pressurized airstreams) across the hinged joints of a commodity distribution machine, while allowing adjoining hinged sections to rotate through a relatively broad angular range of motion. Embodiments of the rotational fluid joints may provide such a rotatable fluid coupling between plumbing lines even when the plumbing lines extend substantially perpendicular to the hinge axes between adjacent machine sections, which may be oriented in fore-aft directions. Embodiments of the rotational fluid joints described herein may also enable a relatively tight longitudinal packing of the rotational fluid joints in multi-joint banks positioned along the hinge axes of the commodity distribution machine. Embodiments of the rotational fluid joints may further decrease bends or kinks in the plumbing lines, reduce overall plumbing line length, decrease the likelihood of physical interference with neighboring components carried by a commodity distribution machine, and provide improved retention of the plumbing lines at the fold joints of the commodity distribution machine. In still further embodiments, the hinged joints assume other forms and include other structural components suitable for conducting a commodity-entrained airstream across one or more hinge axes of a multi-section commodity distribution machine. For example, in alternative embodiments, the hinge joints may be implemented as segmented ball joint connectors.

In further embodiments, the rotational fluid joints can be integrated into commodity distribution systems and machines configured to disperse agricultural commodities or other materials utilizing carrier fluids (liquids or gasses) other than pressurized air. For example, embodiments of the rotational fluid joint can be utilized within a sprayer-type commodity distribution machine, which disperses one or more agricultural commodities carried by pressurized water streams. In this case, the commodity-entrained water streams may pass through the rotational fluid joints prior to flowing into an array of nozzles or other outlets mounted at various locations across the commodity distribution machine, which may be a hinged multi-section implement similar to those previously described. The commodity-entrained water streams are then discharged by the nozzles as a diffuse spray or, perhaps, relatively concentrated jets to disperse the commodities over a desired area.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. In an agricultural machine having a first frame section and a second frame section hinged to the first frame section, the first frame section and the second frame section each carrying one or more plumbing lines for moving a carrier fluid, a rotational joint comprising:
a first joint part having a first coupler defining a first flow passage leading to a first interface opening; and
a second joint part having a second coupler defining a second flow passage leading to a second interface opening;
wherein the first joint part is coupled to the second joint part to allow for relative rotation about a rotation axis passing through the first and second interface openings;
wherein, in at least one angular orientation of the first and second joint parts, the first flow passage of the first coupler is in fluid communication with the second flow passage of the second coupler; and
wherein the first and second couplers have respective first and second coupler openings about respective first and second axes that are perpendicular to the rotation axis such that the first and second coupler openings are perpendicular to planes defining the respective first and second interface openings.

2. The rotational joint of claim 1, wherein the first and second interface openings are configured so that, at least in one angular orientation of the first and second joint parts, a first periphery of the first interface opening aligns with a second periphery of the second interface opening about the rotation axis.

3. The rotational joint of claim 1, wherein the second interface opening has a cross-sectional area taken in a plane perpendicular to the rotation axis at least as large as that of the first interface opening.

4. The rotational joint of claim 1, wherein the first and second interface openings have circular cross-sections concentric with the rotation axis; and
wherein the first and second interface openings have respective first and second peripheries that align along the rotation axis throughout relative rotation of the first and second joint parts about the rotation axis.

5. The rotational joint of claim 4, wherein the first joint part is rotatable about the rotation axis with respect to the second joint part through at least 180 degrees.

6. The rotational joint of claim 1, wherein the first interface opening has a cross-sectional area taken in a plane perpendicular to the rotation axis at least as large as the first flow passage and the second interface opening has a cross-sectional area taken in a plane perpendicular to the rotation axis at least as large as the second flow passage; and
wherein the cross-sectional area of the second interface opening is at least as large as that of the first interface opening.

7. The rotational joint of claim 6, wherein the first and second interface openings have circular cross-sections concentric with the rotation axis; and
wherein the first and second flow passages are non-circular.

8. The rotational joint of claim 1, wherein the first and second coupler openings face in opposite directions when the first and second joint parts are in a first angular orientation.

9. The rotational joint of claim 1, wherein the first and second have respective first and second hub flanges extending outward from the first and second interface openings.

10. The rotational joint of claim 9, further including a collar engaging the first and second hub flanges to rotationally couple the first joint part to the second joint part.

11. The rotational joint of claim 10, wherein each of the first and second couplers extends from the respective first and second hub flanges at an acute angle less than 45 degrees.

12. An agricultural machine, comprising:
a first frame section having a first plumbing line in which a carrier fluid is moved;
a second frame section coupled to the first frame section along a hinge axis and having a second plumbing line in which the carrier fluid is moved; and
a rotational joint having a first joint part with a first coupler connected to the first plumbing line of the first frame section and a second joint part with a second coupler connected to the second plumbing line of the second frame section, the first and second joint parts being connected to one another to allow for relative rotation about a rotation axis which is coaxial with the hinge axis;
wherein the rotational joint is configured so that, at least when the first frame section is in an operational state substantially parallel to the second frame section, a first flow passage of the first coupler is in fluid communication with a second flow passage of the second coupler to pass the carrier fluid from the first plumbing line of the first frame section to the second plumbing line of the second frame section; and
wherein the first and second couplers have respective first and second coupler openings about respective first and second axes that are perpendicular to the rotation axis such that the first and second coupler openings are perpendicular to planes defining the respective first and second interface openings.

13. The machine of claim 12, further including a collar; and
wherein the first joint part has a first hub flange defining a first interface opening leading to the first flow passage, and the second joint part has a second hub flange defining a second interface opening leading to the second flow passage; and
wherein the collar is connected to the first and second hub flanges to couple the first and second joints parts to allow for relative rotation about the rotation axis passing through the first and second interface openings.

14. The machine of claim 12, wherein the first and second interface openings are configured so that, in the operational state, the first joint part is oriented with respect to the second joint part so that flow from the first interface opening to the second interface opening is unimpeded by the second joint part.

15. The machine of claim 14, wherein the first and second interface openings have circular cross-sections concentric with the rotation axis and have peripheries that align along the rotation axis throughout rotation about the rotation axis.

16. The machine of claim 15, wherein the first joint part is rotatable about the rotation axis with respect to the second joint part through at least 180 degrees.

17. The machine of claim 16, wherein the first and second flow passages are non-circular.

18. The machine of claim 13, wherein the first and second couplers extend from the first and second hub flanges to the respective first and second coupler openings; and wherein each of the first and second couplers extends from the respective first and second hub flanges at an acute angle less than 45 degrees.

* * * * *